F. HIRSCH.
SCREW CUTTING MACHINE.
APPLICATION FILED NOV. 20, 1911.
1,064,220.
Patented June 10, 1913.
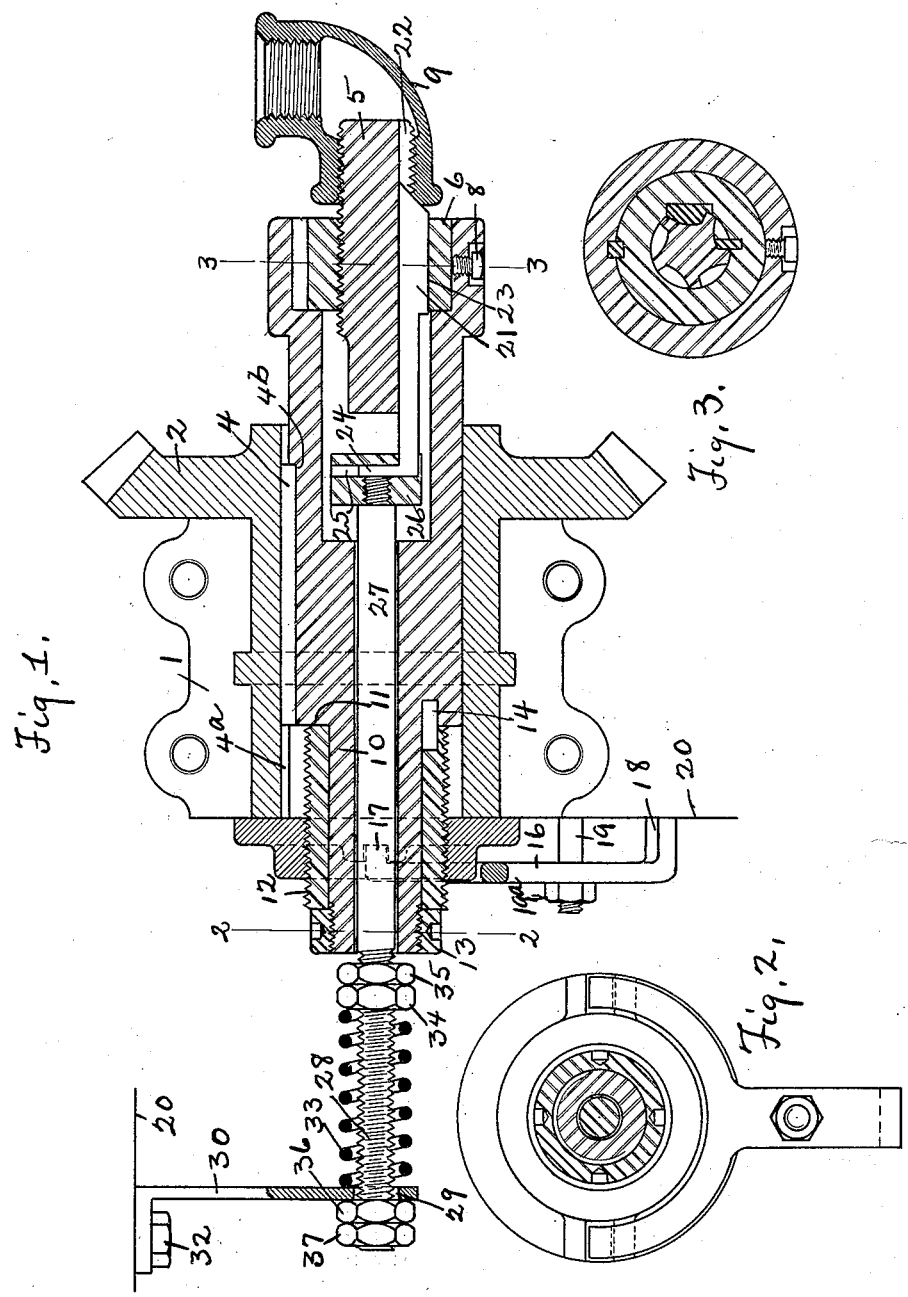

UNITED STATES PATENT OFFICE.

FRANK HIRSCH, OF ERIE, PENNSYLVANIA, ASSIGNOR TO JARECKI MANUFACTURING COMPANY, OF ERIE, PENNSYLVANIA, A CORPORATION OF PENNSYLVANIA.

SCREW-CUTTING MACHINE.

1,064,220.  Specification of Letters Patent.  Patented June 10, 1913.

Application filed November 20, 1911. Serial No. 661,347.

*To all whom it may concern:*

Be it known that I, FRANK HIRSCH, a citizen of the United States, residing at Erie, in the county of Erie and State of Pennsylvania, have invented new and useful Improvements in Screw-Cutting Machines, of which the following is a specification.

This invention relates to screw cutting machines, and consists in certain improvements in the construction thereof as will be hereinafter fully described and pointed out in the claims.

The object of the invention is to provide a screw cutting device with a face cutter which will face a fitting or similar article being threaded.

The invention is illustrated in the accompanying drawings as follows:—

Figure 1 shows a central section of a spindle and coöperating parts. Fig. 2 a section on the line 2—2 in Fig. 1. Fig. 3 a section on the line 3—3 in Fig. 1.

1 marks the spindle bearing, 2 the drive gear for the spindle. This has an extended hub which is journaled in the bearing 1.

3 marks the spindle. The spindle is locked with the gear by means of a spline 4 which is arranged in the grooves 4ª and 4ᵇ in the gear and spindle respectively. A tap or screw cutting device 5 is screwed into a collar 6 and locked therewith by any convenient means. The collar extends into a cavity in the end of the spindle and is locked therein by a set screw 8. A fitting 9 is shown in place to be operated upon by the tap. The spindle has a reduced extension 10, the reduction forming a shoulder 11 on the spindle. A feed screw 12 is slipped on to the extension 10 and rests against the shoulder 11. It is locked in place by the nut 13 and locked against rotation on the spindle by the key 14.

A feed nut 15 is arranged against the end of the bearing 1 and is clamped in place by a yoke 16, the yoke having a crotch, the arms of which terminate in the lugs 17 which extend into detents in the nut 15, thus locking the nut against turning. The yoke 16 has a lug 18 which contacts a part of the frame 20 and a bolt 19 extends from the frame through the yoke 16 and is provided with a nut 19ª by means of which pressure may be exerted on the yoke to clamp the nut 15 against the side of the bearing 1. The gear 2 is driven by the ordinary mechanism of screw cutting machines so as to advance and withdraw the tap 5.

A reamer or face cutter 21 is arranged in one of the grooves 22 of the tap and extends through a key-way 23 in the collar 6. In the absence of other means for locking the cutter with the collar this face cutter will form the key for locking the tap against turning in the collar. The rear end of the reamer is provided with a lateral extension 24 which extends into an opening 25 in the nut 26. The nut 26 is arranged in the reamer spindle 27 which extends through the tap spindle 3. The reamer spindle 27 terminates in an extended screw thread 28 and extends through the perforation 29 in the bracket 30, the bracket 30 being attached to a part 20 of the machine by a screw 32. A spring 33 is arranged around the reamer spindle 27, one end of the spring rests against the bracket 30 and the opposite end against a nut 34 on the screw threaded portion 28. The nut 34 is locked in adjustment by the nut 35.

It will be seen that as the tap spindle is withdrawn, it engages the end of the extension 10 and withdraws the reamer spindle 27 and reamer with the tap, this movement being against the pressure exerted by the spring 33. As the tap is fed forward, the spring 33 forces the reamer spindle forward with the tap spindle, thus bringing the reamer into cutting position to ream or face the fitting. A nut 36 is arranged on the outer end of the reamer spindle and locked in adjustment by the nut 37. This nut 36 limits the feed movement of the reamer 21 by coming in contact with the bracket 30. The feeding movement of the reamer may be adjusted as desired by this nut 36. In other words, the forward movement may be stopped at any point desired to give the proper movement to the reamer by this nut 36. After the feeding movement of the reamer is stopped by the nut 36, the tap may advance to complete its work. Upon the return movement of the tap, it picks up the reamer spindle by a contact between the extension 10 and nut 35. The point at which the reamer is picked up so as to give sufficient withdrawing movement to the reamer may be adjusted by the nuts 35 and 34 as desired. It will be noted that the spring forms a pressure device for exerting pressure on the reamer spindle and that it is concentrically mounted with the spindle.

What I claim as new is:—

1. In a screw cutting machine, the combination of a spindle; a face cutter rotated with the spindle; a screw cutter carried by the spindle; a feed screw operating on the spindle; a spring mounted concentrically with the spindle exerting pressure on the face cutter to actuate it in one direction; and means actuated by the spindle for actuating the face cutter axially with the spindle and against the spring in the opposite direction.

2. In a screw cutting machine, the combination of a screw cutter spindle; a face cutter actuated with said spindle; a screw cutter carried by said spindle; a feed screw operating on said spindle; a face cutter spindle extending from the face cutter within the screw cutter spindle; and devices independent of the spindle operating upon the rear end of the face cutter spindle for actuating the same to force the face cutter forward into feeding position and to withdraw the same.

3. In a screw cutting machine, the combination of a screw cutter spindle; a face cutter actuated with said spindle; a screw cutter carried by said spindle; a feed screw operating on said spindle; a face cutter spindle extending from the face cutter within the screw cutter spindle; devices operating upon the rear end of the face cutter spindle for actuating the same to force the face cutter forward into feeding position and to withdraw the same; and means acting on the face cutter spindle for limiting its movement relatively to the movement of the screw cutter spindle.

4. In a screw cutting machine, the combination of a screw cutter spindle; a face cutter actuated with said spindle; a screw cutter carried by said spindle; a feed screw operating on said spindle; a face cutter spindle extending from the face cutter within the screw cutter spindle; devices operating upon the rear end of the face cutter spindle for actuating the same to force the face cutter forward into feeding position and to withdraw the same; means operating the rear end of the face cutter spindle for giving it a feed movement coincident to the feeding movement of the screw cutter spindle through a part of the travel of the screw cutter spindle; and a stop for limiting the movement of the feed cutter spindle to less than the movement of the screw cutter spindle.

5. In a screw cutting machine, the combination of a screw cutter spindle; a face cutter rotated with said spindle; a screw cutter carried by said spindle; a feed screw operating on said spindle; a face cutter spindle extending within the screw cutter spindle; a yielding pressure device operating upon the face cutter spindle for actuating it in one direction; and means for connecting the face cutter spindle with the screw cutter spindle for actuating the face cutter spindle against the pressure device in the opposite direction.

6. In a screw cutting machine, the combination of a screw cutter spindle; a face cutter rotated with said spindle; a screw cutter carried by said spindle; a feed screw operating on said spindle; a face cutter spindle extending within the screw cutter spindle; a spring arranged on said face cutter spindle for exerting pressure on said face cutter spindle in one direction; and a base independent of the spindle for the spring.

7. In a screw cutting machine, the combination of a screw cutter spindle; a face cutter rotated with said spindle; a screw cutter carried by said spindle; a feed screw operating on said spindle; a face cutter spindle extending within the screw cutter spindle; a spring arranged on said face cutter spindle for exerting pressure on said face cutter spindle in one direction; a base independent of the spindle for the spring and adjustable stops for controlling and limiting the movement of the face cutter spindle.

8. In a screw cutting machine, the combination of a screw cutter spindle; a face cutter carried by said spindle; a screw cutter carried by said spindle; a feed screw for said spindle; a face cutter spindle carried by the screw cutter spindle; a nut on the face cutter spindle having a transverse perforation therein; a lateral projection on the face cutter arranged in said perforation; and means operating on the face cutter spindle for controlling the feed movement of the face cutter.

In testimony whereof I have hereunto set my hand in the presence of two subscribing witnesses.

FRANK HIRSCH.

Witnesses:
JOHN J. BEMER,
B. M. HARTMAN.

---

Copies of this patent may be obtained for five cents each, by addressing the "Commissioner of Patents, Washington, D. C."